Figure 1:
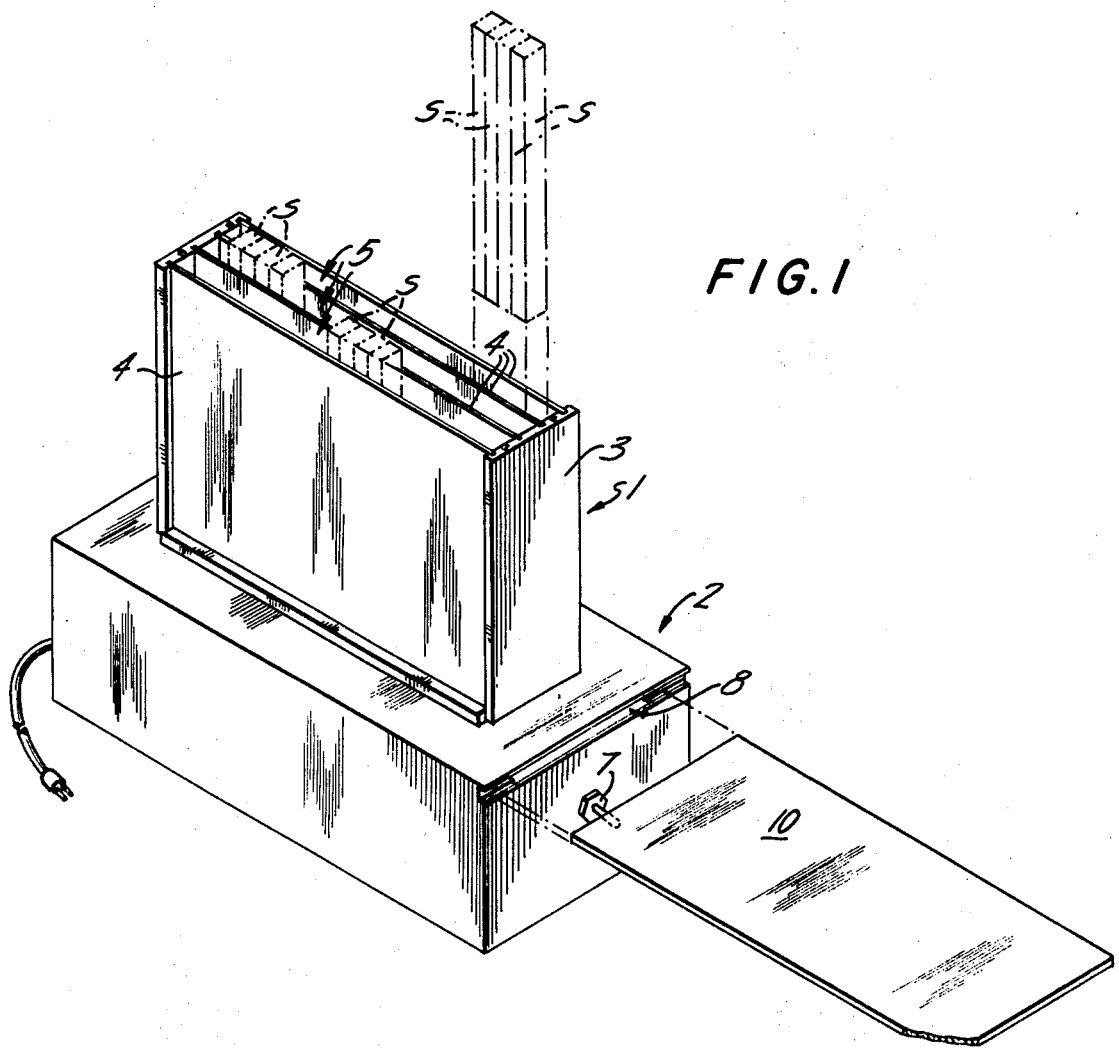
Figure 2:
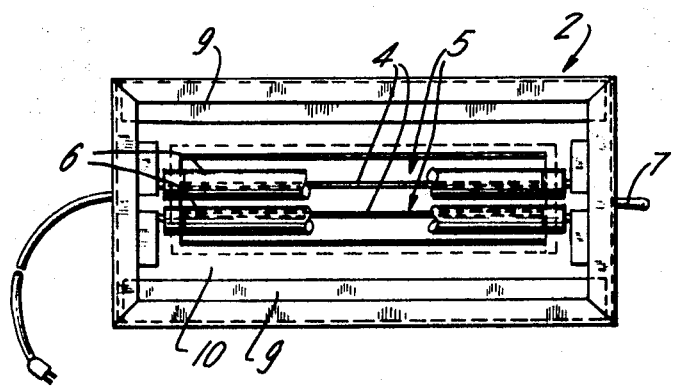

United States Patent

[11] 3,604,812

| [72] | Inventor | Bernard Hugo Walsen<br>Ramsey, N.J. |
|---|---|---|
| [21] | Appl. No. | 46,060 |
| [22] | Filed | June 15, 1970 |
| [45] | Patented | Sept. 14, 1971 |
| [73] | Assignee | Dart Industries, Inc.<br>Los Angeles, Calif. |

[54] DEVICE FOR COMPARATIVE COLOR TESTING
8 Claims, 7 Drawing Figs.

[52] U.S. Cl. .................................................. 356/173,
356/244, 35/19 B, 35/28.3
[51] Int. Cl. ...................................................... G01j 3/76
[50] Field of Search ............................................. 356/244,
173, 256, 18–185, 246, 24; 35/19 B, 28.3

[56] References Cited
UNITED STATES PATENTS
3,519,360  7/1970  Kudlek ..................... 356/195
FOREIGN PATENTS
67,840   5/1951  Netherlands ............... 356/244
404,014  6/1945  Italy ........................... 356/244
447,171  5/1936  Great Britain ............... 356/244

*Primary Examiner*—Ronald L. Wibert
*Assistant Examiner*—R. T. Webster
*Attorneys*—Ronald J. Carlson, Fred S. Valles and Richard A. Dannells, Jr.

ABSTRACT: A device for visually comparing the inherent color of specimens of materials, such as transparent polystyrene, under substantially uniform conditions. The device comprises a specimen receiving means mounted to a base housing, said specimen receiving means having sidewalls defining at least one chamber having upper and lower end openings, the upper end opening being adapted to receive a test specimen into the chamber and the lower end opening communicating with the interior of the base housing, and known light source mounted in the base housing and adapted to direct light waves through the lower end opening of the chamber and illuminate the test specimen received in the chamber.

PATENTED SEP 14 1971

3,604,812

SHEET 1 OF 2

INVENTOR.
BERNARD H. WALSEN

BY Ronald J. Carlson
ATTORNEY

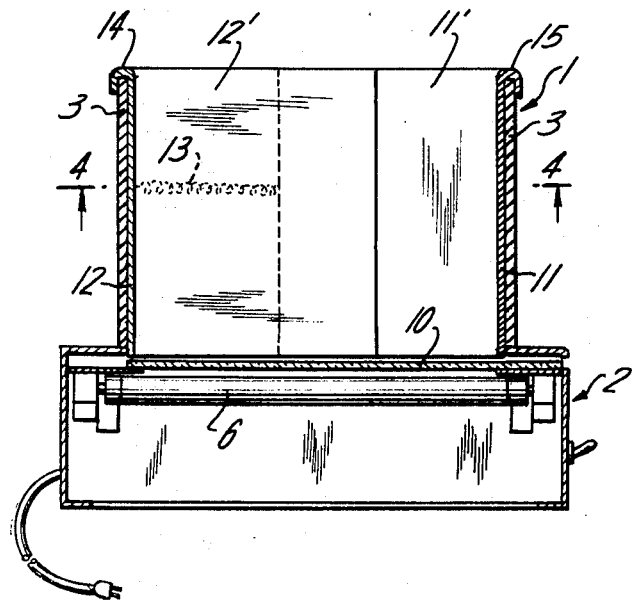
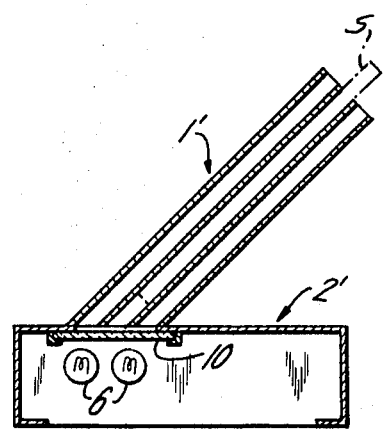
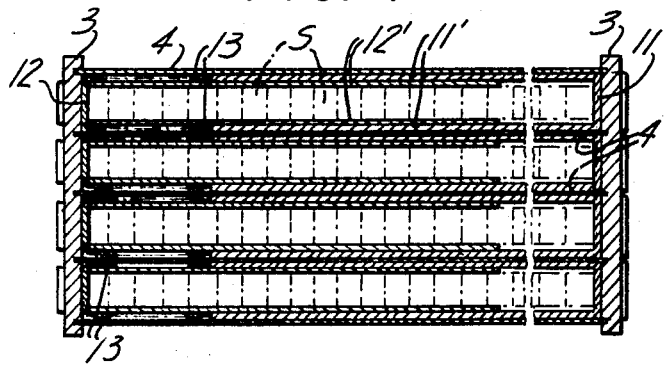
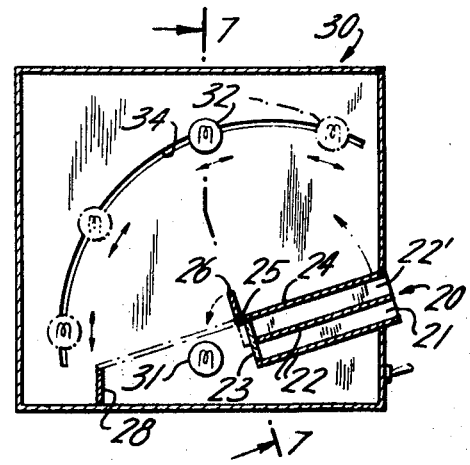
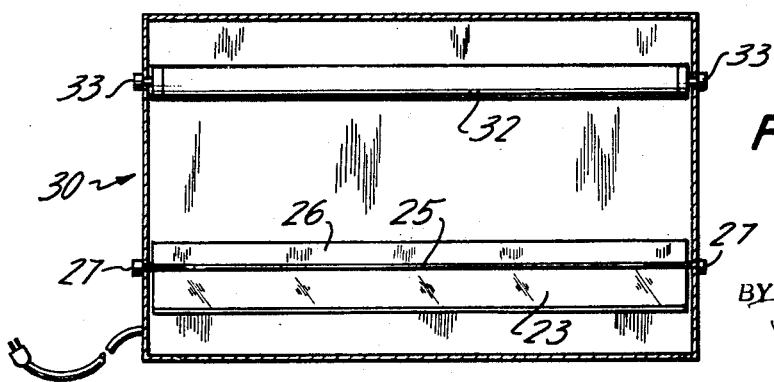
INVENTOR.
BERNARD H. WALSEN

DEVICE FOR COMPARATIVE COLOR TESTING

This invention relates to a device for determining inherent color of various materials, such as transparent thermoplastics, by comparative testing.

Heretofore, it has been general practice for the manufacturers of plastic materials, particularly transparent thermoplastics such as polystyrene and the like, in conducting their quality control to test samples of the materials against a standard of like material and determine the inherent color of the samples. In brief, the test involves establishing a standard having the desired inherent color characteristics by molding a test specimen from the raw material which constitutes the standard. The test specimen can be any shape but usually is in the form of a small rectangular bar. The raw material of the sample to be tested is likewise molded into a test specimen having a corresponding form. The two test specimens, the sample and the standard, are then placed adjacent to each other separated by an opaque material and held up to a light source, preferably so that the light waves pass through the specimens in an axial direction. A visual comparison of the color of the two specimens is then made and a judgment is made as to acceptability of the sample raw material with regard to inherent color as compared to the standard.

In accordance with this invention there is provided a device for conducting such tests under substantially uniform conditions in a relatively simple and efficient manner with good reproducibility. Briefly described, the device comprises a specimen receiving means mounted to a base housing. The specimen receiving means has sidewalls defining at least one chamber having upper and lower end end openings, the upper end opening being adapted to receive a test specimen into the chamber and the lower end opening communicating with the interior of the base housing. A known light source is mounted in the base housing and is adapted to direct light waves through the lower end opening of the chamber and illuminate the test specimen received in the chamber. Using the device (in its simplest form) to perform a test merely involves placing a sample specimen and a standard specimen, separated from each other by an opaque barrier such as a strip of black paper, into the chamber of the specimen-receiving means, illuminating the light source and visually observing the inherent color of the illuminated specimens for comparison. Since the specimens are positioned in close relationship to each other any differences in inherent color may be readily observed. Also, the particular structure of the device insures that both the sample specimen and standard specimen are exposed to substantially the same light conditions so as to enable the performance of accurate comparative testing.

Other features and advantages of the invention will be readily apparent from the following description and the accompanying drawings herein:

FIG. 1 is a perspective view of one embodiment of the device constituting the invention wherein several specimens to be tested are shown in phantom lines;

FIG. II is a bottom view of the embodiment shown in FIG. I;

FIG. III is a cross-sectional side elevation view of a similar embodiment to that shown in FIG. I and illustrates in cross section and phantom lines a removable specimen holder which may, optionally, form part of the specimen receiving means;

FIG. IV is a top view of the embodiment shown in FIG. III taken along line IV—IV;

FIG. V is a cross-sectional side elevation view of another embodiment of the invention wherein the specimen receiving means is positioned at an inclined angle relative to the base housing for ease in visually observing the specimens being tested;

FIG. VI is a cross-sectional side elevation of still another embodiment of the invention wherein a second adjustable light source is provided for secondary testing of specimens;

FIG. VII is a cross-sectional view of the embodiment shown in FIG. VI taken along line VII—VII.

With reference to the embodiment shown in FIG. I there is shown a specimen receiving means 1 mounted to a base housing 2. The specimen receiving means comprises sidewalls 3 and 4 defining chambers 5 which are open at their upper and lower ends. The upper open ends of the chambers are adapted to receive the test specimens S shown in phantom lines in three groups. The lower open ends of the chambers communicate with the interior of the base housing 2 as shown more clearly in FIG. II. While the specimen receiving means is illustrated with three chambers capable of receiving a plurality of test specimens it will be understood that any number of chambers of any size may be employed including a single chamber capable of receiving a single test specimen. Also, the chambers and test specimens may be of any configuration although the configurations illustrated are preferred.

The base housing 2 comprises an enclosure in which a light source is mounted. As illustrated in FIG. II the light source comprises two conventional fluorescent lamps 6 conventionally mounted to extend in a manner paralleled to the lower open ends of the chambers 5 receiving the test specimens. In this manner substantially the same light conditions are set up in each chamber. Of course, any suitable light source may be used along with any convenient mounting system provided that the light conditions produced in the chambers are substantially the same to the extent necessary for the particular test. A conventional switch 7 is provided for control of the light source. The base housing 2 may also be provided with an opening 8 and internal ledge-type supports 9 for receiving and supporting a light-diffusing plate 10. This plate is positioned between the light source and the lower open ends of the chambers 5 and functions to evenly distribute the light emanating from the light source prior to entry into the chambers. The light diffusing plate may conveniently be a section of frosted glass. Of course, other equivalent materials will be readily understood as suitable substitutes. It is also pointed out that the light diffusing plate may serve to support the test specimens within the chambers although this is not essential as a narrow flange-type support may be provided in the lower open end of the chambers for this purpose. The light diffusing plate is optional and not a necessary feature for operation of the device.

In operation of the device just described and illustrated there are three groups of test specimens, one group represents a first sample material, another group represents a second sample material, and the third group represents a standard material. Since the test specimens within each group are of the same material there is no need to separate them from each other with an opaque material. However, the three groups are separated from each other, namely by the internal sidewalls 4. This prevents light from being transmitted between the sample specimens and the standard specimens and interfering with the comparative testing. Once the groups of specimens have been inserted in the three chambers, in this case supported by the light diffusing plate, the light source is illuminated and in turn illuminates the test specimens. The three groups of test specimens are then visually observed at their upper ends and a comparison of inherent color characteristics is made easily and quickly with assurance that the light conditions are substantially equivalent for each of the three groups.

While the embodiment of the device in FIGS. I and II is shown with three chambers and dual lamps for a light source it will be understood that these may vary in number, shape and kind consistent with the disclosed concepts. Likewise, the described manner of operation of the device may vary since only a single standard specimen and single sample specimen need be tested and both may be placed in a single chamber separated by an opaque material for comparison.

Next, with reference to FIGS. III and IV, there is optionally provided a removable specimen holder forming part of the specimen receiving means 1. The specimen holder comprises two U-shaped members 11 and 12, best seen in FIG. IV. Member 12 is of such dimensions that its leg portions 12' slidably fit inside of leg portion 11' of member 11 to define a space therebetween wherein the test specimens S may be placed as shown in phantom lines in FIG. IV. The two U- shaped members 11 and 12 are resiliently urged together by spring means 13 to clamp the test specimens in place. The spring means 13 are fixed at their opposite ends to the respective U-shaped members. The entire specimen holder with test specimens resiliently held therein is of such a size as to be placed within a chamber of the specimen-receiving means. Each of the U-shaped members 11 and 12 may be provided with clip portions 14 and 15 at their upper ends to engage the upper edges of sidewalls 3 and retain the holder in place. These clip portions may also serve as a convenient means for inserting and withdrawing the holder from the chamber.

A variation of the device of FIG. I is shown in FIG. V wherein the specimen-receiving means 1' is of similar construction except that it is mounted at an inclined angle to base housing 2'. In this manner, the test specimens may be placed in the device and viewed in a convenient manner.

FIG. VI illustrates a further embodiment of the invention wherein there is provided a specimen-receiving means 20 angularly mounted to and within a base housing 30. The specimen receiving means is again provided with sidewalls 21 defining lower chamber 22 and upper chamber 22' for receiving the test specimens. However, in this arrangement, the bottoms of the chambers are formed by a member 23 which will transmit light. This member 23 may also serve as light diffuser. In addition, the upper sidewall 24 of chamber 22' is pivotally mounted about an axis 25 and has an outwardly extending leg segment 26. The sidewall 24 may be pivoted about the axis by turning the knobs 27 attached to an axle protruding through the walls of the base housing 30 and upon which the sidewall is mounted. As shown in FIG. VI, the sidewall and leg segment may be pivoted about 180° in the direction indicated by the arrows until coming into engagement with stop member 28. This aspect of the invention will be discussed later in describing the operation of this embodiment.

In the base housing 30, which substantially surrounds the specimen-receiving means, a first light source 31 is fixedly mounted adjacent the lower ends of the chambers 22 and 22'. This light source is positioned to transmit light through the chambers and to illuminate any test specimens contained therein. In addition to the first light source there is a second light source 32 on conventional mounts 33 which are movably mounted in arcuate slots 34 in each side of the base housing whereby the second light source may be positioned using knobs 33 at various angles to the side of the upper chamber 22'. The second light source is preferably of the same type as light source 31.

In operation of the embodiment illustrated in FIGS. VI and VII, a sample specimen is preferably placed in the upper chamber 22' of the specimen-receiving means 20 and a standard specimen is placed in the lower chamber 22. With the sidewall 24 in the position shown, the light source 31 is illuminated and both specimens become illuminated by the light passing through member 23. A visual comparison of inherent color of the two specimens is then made and noted. Then, if desired, the resulting comparison is further checked by rotating sidewall 24 through 180° so that it rests on stop member 28. In this position, the side surface of the sample specimen in upper chamber 22' is exposed to the interior of the base housing while the end surface of the sample specimen becomes blocked from receiving any light waves from light source 31 by virtue of leg segment 26 overlying the corresponding portion of member 23. Light source 32, positioned at the desired angle, is then illuminated and illuminates the test specimen from the side rather than the end. A second visual comparison is then made and noted for comparison with the first test.

Thus, having described the invention in detail it will be understood by those skilled in the art that certain variations and modifications may be made without departing from the spirit and scope of the invention.

I claim:

1. A device for determining inherent color of a specimen comprising a specimen-receiving means mounted to a base housing, said specimen-receiving means having sidewalls defining at least one chamber having upper and lower open ends, said upper open end being adapted to receive at least one specimen into the chamber and said lower end communicating with the interior of said base housing, a light source mounted in said base housing and adapted to direct light toward the lower open end of the specimen-receiving means and illuminate any specimen received in said chamber.

2. A device according to claim 1 wherein a light diffusing plate is mounted between said light source and said lower open end of said chamber.

3. A device according to claim 1 wherein the specimen-receiving means comprises a plurality of chambers which are in the form of elongated slots.

4. A device according to claim 3 wherein each slot is of such dimensions as to receive a single specimen.

5. A device according to claim 1 wherein said specimen holding means includes a removable specimen holder adapted to resiliently hold a plurality of specimens in a adjacent relationship to each other and which may be positioned within a chamber of said specimen-receiving means.

6. A device according to claim 1 wherein the specimen-receiving means is mounted so as to extend into said base housing, the sidewalls of said specimen-receiving means defining upper and lower chambers, said upper chamber having an external sidewall pivotally mounted about an axis adjacent the lower end opening of the chamber and a leg segment extending outward from the sidewall at a location adjacent the pivotal axis whereby upon pivoting the sidewall to an open position the lower open end of said upper chamber is closed by the leg segment and the side of said upper chamber is exposed to the interior of said base housing, and a second light source mounted in said base housing adapted to direct light toward the exposed side of the upper chamber and illuminate any specimen received in said chamber.

7. A device according to claim 6 wherein said second light source is movably mounted in an arc within said base housing and above the upper chamber of said specimen-receiving means.

8. A device according to claim 1 wherein the light source is a fluorescent lamp.

UNITED STATES PATENT OFFICE
CERTIFICATE OF CORRECTION

Patent No. 3,604,812            Dated September 14, 1971

Inventor(s) Bernard Hugo Walsen

It is certified that error appears in the above-identified patent and that said Letters Patent are hereby corrected as shown below:

Column 4, Line 23 of subject patent should be changed so that the last line of Claim 1 reads as follows:

and illuminate any specimen received in said chamber and specimen holding means for being positioned in said specimen receiving means for holding at least said specimen.

Signed and sealed this 29th day of February 1972.

(SEAL)
Attest:

EDWARD M. FLETCHER, JR.          ROBERT GOTTSCHALK
Attesting Officer                  Commissioner of Patents